(12) United States Patent
Edgar, III

(10) Patent No.: US 6,289,099 B1
(45) Date of Patent: Sep. 11, 2001

(54) RINGER FOR SATELLITE USER TERMINALS

(75) Inventor: Clement B. Edgar, III, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/201,520

(22) Filed: Nov. 30, 1998

(51) Int. Cl.[7] .................. H04Q 7/00; H04M 1/00
(52) U.S. Cl. .............. 379/374.01; 379/398-400; 379/374; 379/142; 379/374.01; 379/374.02; 379/373.02; 379/373.03; 379/373.04; 379/375.01; 379/418; 379/201; 370/201; 370/210; 370/354
(58) Field of Search .................. 379/398–400, 379/374, 142, 374.01, 374.02, 373.02, 373.04, 375.01, 418, 201; 381/77, 94, 120, 118; 455/550, 554, 403, 551, 553, 427, 555, 556, 557; 370/201, 216, 354

(56) References Cited

U.S. PATENT DOCUMENTS

| | | | |
|---|---|---|---|
| 4,656,659 | * | 4/1987 | Chea ................................ 379/253 |
| 4,866,766 | * | 9/1989 | Mitzlaff ........................... 379/374 |
| 4,901,307 | | 2/1990 | Gilhousen et al. . |
| 5,323,451 | | 6/1994 | Yatsunami . |
| 5,414,796 | | 5/1995 | Jacobs et al. . |
| 5,568,561 | * | 10/1996 | Whitlock ........................ 381/120 |

(List continued on next page.)

FOREIGN PATENT DOCUMENTS

| | | |
|---|---|---|
| 2210755 | 6/1989 | (GB) . |
| 2201755-A | * 6/1989 | (GB) ........................... H04M/1/02 |
| 63296436 | 12/1988 | (JP) . |
| 06204927 | 7/1994 | (JP) . |
| 07177224 | 7/1995 | (JP) . |

OTHER PUBLICATIONS

Patent Abstracts of Japan vol. 018, No. 560 (E–1621), Oct. 26, 1994 & JP 06 204927 A (Nec Corp), Jul. 22, 1994.
Patent Abstracts of Japan vol. 1995, No. 10, Nov. 30, 1995 & JP 07 177224 A (Nec Corp), Jul. 14, 1995 abstract.
Patent Abstracts of Japan vol. 013, No. 128 (E–735), Mar. 29, 1989 & JP 63 296436 A (Nec Corp), Dec. 2, 1988 abstract.
Hal Chamberlin, Musical Applications of Microprocessors, Pub. Hayden Book Company, Inc., Rochelle, NJ, 1998; pp. 396–398.*

Primary Examiner—Forester W. Isen
Assistant Examiner—Ramnandan Singh
(74) Attorney, Agent, or Firm—Philip R. Wadsworth; Gregory D. Ogrod

(57) ABSTRACT

An apparatus, system, method, and computer program product for providing a flexible ringer for multiple deskset phones. A controller detects a flag message that precedes an incoming telephone call, and selects one or more frequencies based on a local expectation of a ringing telephone at the geographic location, or according to a user preference. A digital signal processor (DSP) generates a digital ringer signal based the selected frequencies. An audio code converts the digital ringer signal to an analog ringer signal and sends the analog ringer signal to multiple deskset phones using a receive cable. The analog ringer signal is amplified to drive a speaker that converts the analog ringer signal into an audible ringer sound at each deskset phone. The audible ringer sound can be customized for multiple geographic locations by modifying the selected frequencies used in the digital ringer signal. In one embodiment, a user selects the current geographic location from a menu of multiple geographic locations, where each geographic location in the menu is assigned the requisite frequencies to meet the local expectation of a ringing telephone. Alternatively, a user selects from a non-geographic specific list of preselected frequencies typically found useful by users.

44 Claims, 7 Drawing Sheets

U.S. PATENT DOCUMENTS

| | | | |
|---|---|---|---|
| 5,652,903 | * 7/1997 | Weng et al. | 395/800 |
| 5,687,227 | * 11/1997 | Cohrs | 379/374 |
| 5,691,974 | 11/1997 | Zehavi et al. | |
| 5,703,934 | * 12/1997 | Zicker | 379/142 |
| 5,787,159 | * 7/1998 | Hamilton | 379/201 |
| 5,898,914 | * 4/1999 | Yamashita | 455/403 |
| 6,058,171 | * 5/2000 | Hoopes | 379/142 |
| 6,097,817 | * 8/2000 | Bilgic | 380/410 |
| 6,192,231 | * 2/2001 | Chapman et al. | 455/401 |

* cited by examiner

FIG. 3: FLEXIBLE RINGER SYSTEM

FIG. 5 : STEP 406 DETAILS

FIG. 6 : STEP 408

RINGER FOR SATELLITE USER TERMINALS

RELATED APPLICATION

This application is related to commonly owned U.S. patent application, filed on even date herewith, entitled "Audio Interface for Satellite User Terminals", having application Ser. No. 09/201,700, which is incorporated herein by reference.

BACKGROUND OF THE INVENTION

I. Field of the Invention

The present invention relates generally to satellite communication systems, and more particularly, to an apparatus, system, method, and computer program product for providing a flexible ringer to announce an incoming telephone call.

II Description of the Related Art

A variety of multiple access communication systems and techniques have been developed for transferring information among a large number of system users. However, spread spectrum modulation techniques, such as code division multiple access (CDMA) spread spectrum techniques, provide significant advantages over other modulation schemes, especially when providing service for a large number of communication system users. The use of CDMA techniques in multiple access communication systems is disclosed in U.S. Pat. No. 4,901,307, which issued Feb. 13, 1990, entitled Spread Spectrum Multiple Access Communication System Using Satellite Or Terrestrial Repeaters, and U.S. Pat. No. 5,691,974, which issued Nov. 25, 1997, entitled Method And Apparatus For Using Full Spectrum Transmitted Power In A Spread Spectrum Communication System For Tracking Individual Recipient Phase Time And Energy, both of which are assigned to the assignee of the present invention, and incorporated herein by reference.

The above referenced patents disclose communication systems in which a large number of generally mobile or remote system users or subscriber units ("user terminals" or "mobile stations") employ at least one transceiver to communicate with other user terminals, or users of other connected systems, such as a public telephone switching network. Communication signals are transferred either through satellites and gateways, or directly to terrestrial base stations (also sometimes referred to as cell-sites or cells).

One type of remote user is a fixed unit, such as a wireless phone, facsimile device, and so forth, in a remote location where wirelines are impractical, such as an offshore oil rig or other remote geographical location. Such remote locations often require that multiple phones be serviced by a single access channel or communications link from a satellite in a "party line" type of service. A party line is a single communications path or link that is used as a shared resource. The defining feature of party line service is that a telephone call can be answered or initiated by a user at one party line phone, and all other party line phones can participate in the telephone call. But, an additional telephone call by a non-participating phone cannot be effected until the first call is terminated.

An exemplary situation would be a telephone call between workers on an offshore oil rig and land-based vendor technicians, where the purpose is to solve a technical problem. It would be advantageous for workers at multiple locations on the oil rig to be able to simultaneously participate in the telephone call. A party line generally having a single access address, code, or telephone number can meet this need. The access address, code, or telephone number could also be referred to as a communications system address, user terminal (UT) address, UT ID, etc.

Another situation in which multiple phones may be required is in a remote geographical land location where it is not cost effective to run standard telephone lines. These may include mid-desert locations, small island locations, rural-third world locations, and the like. In those cases, a community building having multiple rooms, might be set up with phones in each room. Another example would be a remotely located multi-family dwelling, where each family (or business) would want to have a phone. In many of these cases, it would not be cost effective to install separate satellite receiving equipment for maintaining separate communication links for each phone. In each of these cases, a party line arrangement would provide a cost effective method of maintaining efficient telephone communication links.

A remote location with party line service can be efficiently linked to a satellite communications system through a radio antenna unit (RAU). An RAU is a transceiver, comprising well known elements, that transmits and receives a modulated carrier signal to and from the satellite communications system through an antenna. During transmission, the RAU accepts audio signals from the multiple phones. An audio coderdecoder (or audio codec) in the RAU digitizes the audio signals, which are then used to modulate the carrier signal that is radiated to a satellite (or other relay apparatus) by the antenna. During reception, the RAU receives an input signal comprising a modulated carrier signal from a satellite. The RAU demodulates the input signal to retrieve the digital audio signal. After which, the audio codec converts the digital audio signal to an analog audio signal, and causes the analog audio signal to be sent to the multiple phones.

When the audio signals are primarily composed of human speech, a vocoder may be used to compress (de-compress) the digital bit stream before (after) the carrier signal is modulated (de-modulated) to make more efficient use of the carrier signal bandwidth. The vocoder operates on the principle that speech sounds can be predicted and extrapolated based on the analysis of a small portion of a sound. Thus, the vocoder removes selected bits from the digital bit stream before carrier signal modulation, and adds them back after de-modulation. Vocoders are especially useful in wireless communications systems where multiple user or subscribers are competing for limited carrier signal bandwidth.

The above described communications system requires a ringer to notify the phone users of an incoming call so the users can answer or "pick-up" the incoming call. Remote users are by definition capable of being scattered around the entire world, and their expectations of a ringing telephone varies depending on their geographic location. For example, a phone user in India expects a ringing telephone to sound different from a phone user in Brazil or Australia. This is primarily the result of the variation in ringer frequencies and patterns used by geographically diverse service providers. In other words, service provider territories generally terminate at national or geo-political boundaries, and thus ringer frequencies and patterns often change at these boundaries.

A conventional ringer for a POTS (Plain Old Telephone Service) wireline system sends a large AC voltage from a central office over a telephone cable to a phone. The AC voltage is typically 70–90 volts at 15–20 Hz and drives an electromechanical bell ringer that produces the ringing sound. When a user picks-up the receiver a DC loop is formed and a small DC current begin to flow from the central office. The central office detects the DC current flow and terminates the AC voltage driving the bell ringer.

A conventional ringer for a mobile phone, and some fixed phones, is based on a piezo-electric device that generates an audible tone when pulsed by an electrical signal. The mobile phone senses an incoming call and pulses the piezo-electric device, which generates an audible tone that alerts the mobile phone user of an incoming call. Piezo-electric devices are not flexible, that is, they generate audible tones within a narrow frequency range. In order to change operation from one audible tone to another, an existing mobile phone must be fitted with a physically different piezoelectric device.

Both the conventional POTS ringer and the piezo-electric ringer are inappropriate choices for the remote user served by the satellite communications system described above. A conventional POTS ringer is inappropriate because the satellite system is by definition wireless. Thus, there is no telephone cable from the central office with which to carry the AC voltage that drives the electromechanical bell.

The piezo-electric device is inappropriate because it is too inflexible, and different use-areas or regions often use entirely different audible tones or signals for announcing an incoming call. If a piezo-electric device were used, the location of each remote user would have to be known prior to manufacturing the phones in order to install the proper piezo-electric device. This information is unlikely to be available at the time of manufacture, and the manufacturing cost associated with carrying multiple piezo-electric devices would be prohibitively expensive even if it was available. What is needed is a flexible ringer for use with a satellite party line phone system serving users at variable geographic locations.

The preceding discussion focused on the motivation for a flexible ringer in a party line phone system. A flexible ringer would also be useful for a single line configuration (i.e. one phone per phone number, UT address, or UT ID) where the phone could be used in variable geographic locations. The phone could be stationary or mobile (or portable), and the flexible ringer would enable the ringer sound to be customized to satisfy the local ringer requirements for multiple geographic locations. For example, the ability to customize the ringer sound would be useful to a phone manufacturer that is uncertain of the final destination of each phone at the time of it's manufacture. A flexible ringer would permit a service provider to select a ringer sound upon delivery of a shipment of phones.

Furthermore, a flexible ringer would allow an individual phone user to customize the ringer sound as desired, independent of any geographic location. If the phone is transferred to a second user, the second user may also adjust the ringer sound as desired, and so on for multiple serial phone users.

SUMMARY OF THE INVENTION

The present invention is directed toward an apparatus, system, method, and computer program product for providing a flexible ringer for a deskset phone.

The flexible ringer comprises a controller for detecting a flag message that announces an incoming telephone call. The controller selects one or more frequencies for a ringer signal based on the local expectation of a ringing telephone at a geographic location. A digital signal processor (DSP) generates a digital ringer signal based on the frequencies selected by the controller. An audio codec converts the digital ringer signal to an analog ringer signal. An amplifier amplifies the analog ringer signal to drive a receive cable that carries the analog ringer signal to one or more deskset phones. At least one transformer is connected to the receive cable that rejects common mode noise to prevent saturation of subsequent audio components. A second amplifier amplifies the analog receive signal to drive a speaker that converts the analog ringer signal to an audible ringer sound. The controller determines when the telephone call has been answered at a deskset location, and interrupts the generation of the digital ringer signal by the DSP, terminating the audible ringer sound at the deskset phones.

In one embodiment of the invention, a user selects the geographic location from a menu of multiple geographic locations, and the controller selects the requisite frequencies to satisfy the local expectation of a ringing telephone based on the location selected.

In one embodiment of the invention, a user inputs desired frequencies for the digital ringer signal directly into the controller without referencing a geographic location, and without using a menu-like device.

In one embodiment of the invention, the DSP generates the digital ringer signal by determining a sample of a sine wave for each of the frequencies selected by the controller (or the user), sums the sine wave samples to form a composite sample, and digitizes the composite sample. The DSP repeatedly determines the digitized composite samples to produce a frame of digitized composite samples.

In one embodiment, the DSP operates as vocoder on incoming and outgoing telephone conversation after the incoming telephone call has been answered and the ringer signal has been terminated. In doing so, the DSP compresses outgoing the telephone conversation and decompresses the incoming telephone conversation.

One main advantage of the present invention is that it allows for the cost effective installation and operation of multi-party telephone and data communications services in remote locations where standard telephone communications lines cannot be installed at a reasonable cost.

A second advantage is that the audible ringer sound can be customized in a cost effective manner to satisfy the local expectations of a ringing telephone at multiple geographic locations. This is feasible because the audible ringer sound originates as a digital ringer signal comprising samples of multiple sine waves. The digital ringer signal can be customized for multiple geographic locations, or the desires of particular users, by varying the frequencies used to determine the digital ringer signal. Frequency control is implemented by allowing a user to select the current geographic location from a menu of multiple geographic locations stored on a controller. Each geographic location in the menu is pre-assigned the requisite frequencies to meet the local expectation of a ringing telephone. Alternatively, the user can input desired frequencies for the ringer signal directly into the controller without referencing a geographic location. In contrast, conventional ringers require replacement of a physical ringer mechanism in order to modify the audible ringer sound. Typically, this includes the time consuming task of replacing a mechanical bell ringer or piezo-electric device.

A third advantage is that the ringer system components can be re-used as functional components in an audio interface between the multiple deskset phones and an audio codec once the call has been answered and voice conversation begins. This is feasible because the audible ringer sound originates from a tone generator process or program operating on the DSP. Once the call is answered, the tone generator program can be terminated. The same DSP can then operate a vocoder process or program to perform traditional vocoder functions on the incoming and outgoing voice conversation. Furthermore, the analog components in the ringer system operate in the same frequency range as that of the audio interface, and can also be re-used.

BRIEF DESCRIPTION OF THE DRAWINGS

The features, objects, and advantages of the present invention will become more apparent from the detailed description set forth below when taken in conjunction with the figures in which like reference characters identify correspondingly throughout, and wherein.

DETAILED DESCRIPTION OF THE PREFERRED EMBODIMENTS

I. Introduction

The present invention is particularly suited for use in communications systems employing low earth orbit (LEO) satellites. The invention is also applicable to satellite systems in which the satellites travel in non-LEO orbits, and to non-satellite communications systems.

The preferred embodiment of the invention is discussed in detail below. While specific steps, configurations and arrangements are discussed, it should be understood that this is done for illustrative purposes only. The present invention could find use in a variety of wireless information and communication systems, including those intended for position determination, and satellite and terrestrial cellular telephone systems. A preferred application is in CDMA wireless spread spectrum communication systems for telephone service.

II. A Typical Satellite Communications System

Figure 1:
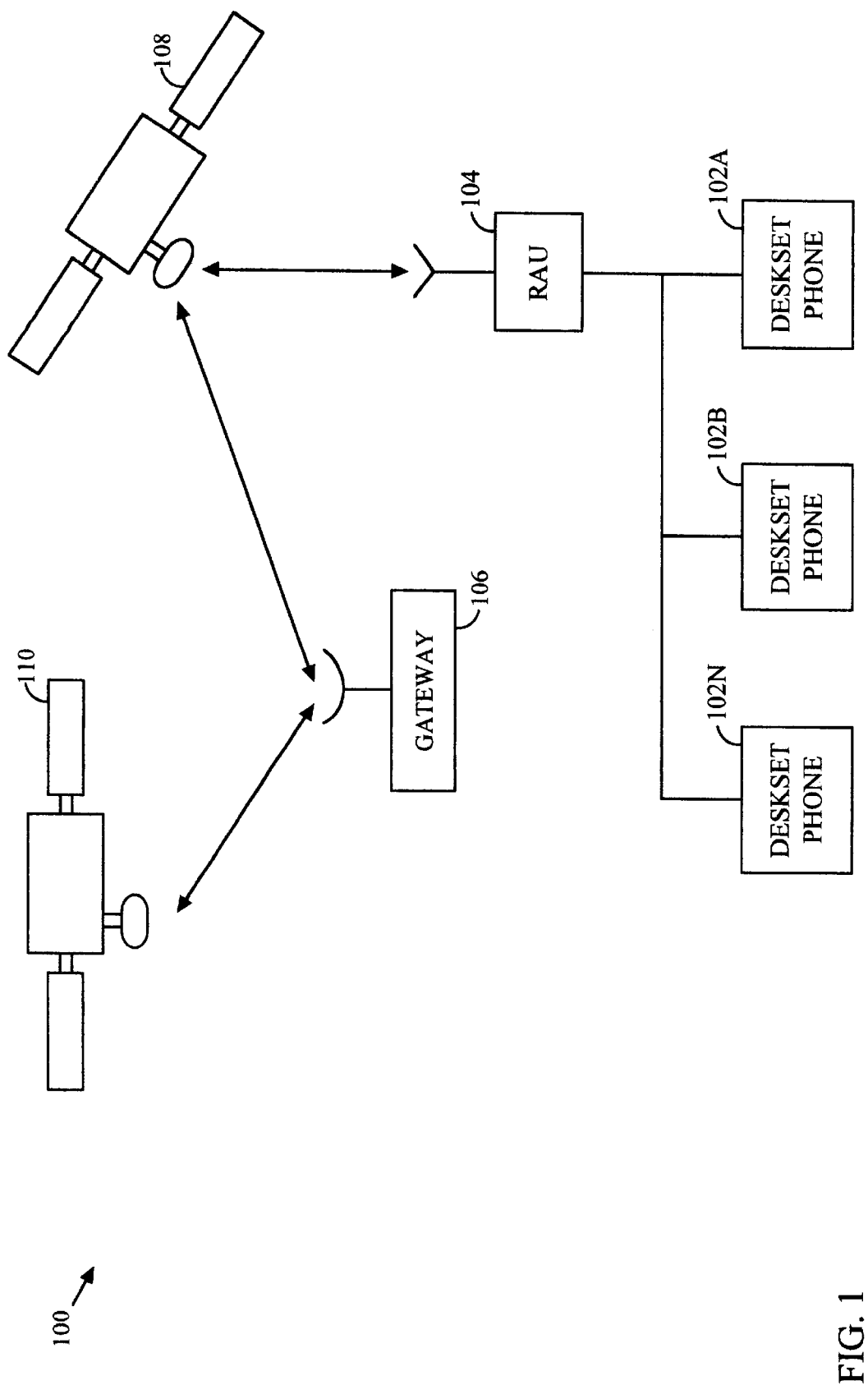
FIG. 1 illustrates an exemplary wireless communications system in which the present invention is useful.

An exemplary wireless communication system in which the present invention is useful is illustrated in FIG. 1. It is contemplated that this communication system uses CDMA type communication signals, but this is not required by the present invention. In a portion of communications system 100 illustrated in FIG. 1, satellites 110 and 108, and associated gateway 106 are shown for effecting communications with deskset phones 102a–n through a single radio antenna unit (RAU) 104. The total number of satellite and gateways in such systems depend on desired system capacity and other factors well understood in the art.

RAU 104 transmits and receives modulated signals to and from satellite 108 through at least one antenna. The modulated signals carry communications (including telephone conversation) to and from desksets 102a–n. In one embodiment, RAU 104 implements well known CDMA spread spectrum techniques to optimize system bandwidth, although not required by the invention. CDMA uses a preselected pseudonoise (PN) code sequence to modulate and spread a digital signal over a predetermined spectral band. A corresponding method is used to recover the digital signal at the destination.

The primary function of deskset phones 102a–n (or "desksets") is to allow deskset users to place and receive wireless telephone calls through communication system 100. Typically, desksets 102a–n would be located in various rooms of a building. They may also be located in different dwellings in a small community. The key aspect is that all the desksets are connected in common to RAU 104.

FIG. 1 illustrates desksets 102a–n providing "party line" service, meaning that desksets 102a–n are connected to and share a single communications link to RAU 104, which is commonly referred to as a telephone line. In one embodiment, up to 8 desksets can share a single telephone line. A feature of party line service is that deskset 102a can answer or initiate a telephone call to a third party and desksets 102b–n can simultaneously participate in the telephone call. But desksets 102b–n cannot simultaneously establish additional telephone calls to a other parties until the first call has been terminated.

The present invention is not limited to a party line configuration. Those skilled in the art will recognize how to implement the present invention in a single line configuration (i.e one deskset per phone number, UT address, or UT ID) based on the discussion given herein. In fact, a party line configuration reduces to a single line configuration when there is only one deskset connected to the party line, as is understood by those skilled in the art.

Figure 2:
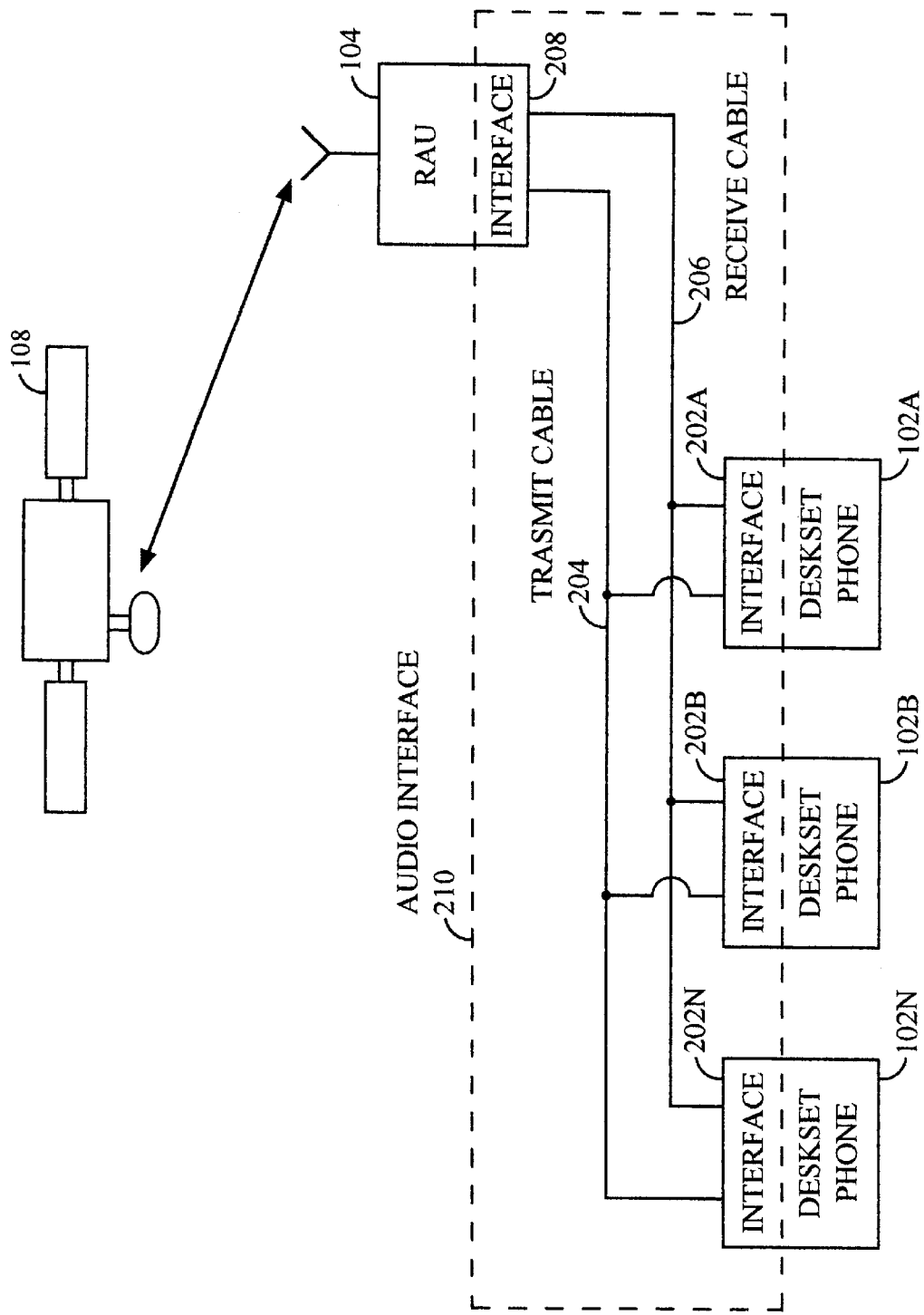
FIG. 2 illustrates an exemplary remote user.

FIG. 2 illustrates desksets 102a–n connected to RAU 104 in a party line configuration by audio interface 210. Audio interface 210 comprises deskset interfaces 202a–n, transmit cable 204, receive cable 206, and RAU interface 208. Once a phone call is initiated, transmit cable 204 carries multiple transmit signals from deskset interfaces 202a–n to RAU interface 208. Transmit signals are audio signals generated from acoustic inputs at desksets 102a–n (e.g voice conversation). Transmit cable 204 carries only transmit signals and is electrically isolated from receive cable 206. RAU 104 digitizes and modulates the transmit signals before relaying them to satellite 108.

Receive cable 206 carries a receive signal from RAU interface 208 to deskset interfaces 202a–n. The receive signal includes two components, a primary receive signal and a sidetone signal. RAU interface 208 combines the two components before sending the receive signal to deskset interfaces 202a–n. RAU 104 generates the primary receive signal from an input signal received from satellite 108. RAU 104 derives the sidetone signal from the transmit signal carried by transmit cable 204. Therefore, the sidetone signal functions as audio feedback which most users find useful in carrying on a conversation, which is otherwise missing in this type of system.

Receive cable 206 also carries the ringer signal that is generated by RAU 104 to announce an incoming telephone call from satellite system 100. Receive cable 206 carries the ringer signal to each deskset 102a–n so that all deskset users will be informed of the incoming call.

As stated earlier, the primary function of desksets 102a–n is to allow deskset users to place and receive wireless telephone calls through satellite system 100. Desksets 102a–n may also have additional features of voice mail, text mail, number storage, and call history that are displayed on a liquid crystal display (LCD). The user interface for desksets 102a–n is typically controlled by software or preselected commands interacting with or operating a controller in RAU 104. RAU 104 sends commands and information over a control bus to desksets 102a–n, where the commands are displayed on the LCD display or used to control light emitting diodes (LEDs).

Physically, desksets 102a–n have a 12-key standard key pad, and buttons for send, clear, menu, information, mail, volume up, and volume down. Desksets 102a–n may have a LCD display with indicators for battery level, and signal strength. Typically, this would be a four line LCD display, although more or less display lines could be used. Other display indicators may include phone-in-use, voice mail waiting, and text mail waiting. Desksets 102a–n may also have provisions for speaker phone capability, including buttons and LED indicators for speaker phone control. Those skilled in the art will recognize that there are other configurations and features that may be implemented for desksets 102a–n.

III. Detailed Invention Description

A. Block diagram of Flexible Ringer System

Figure 3:
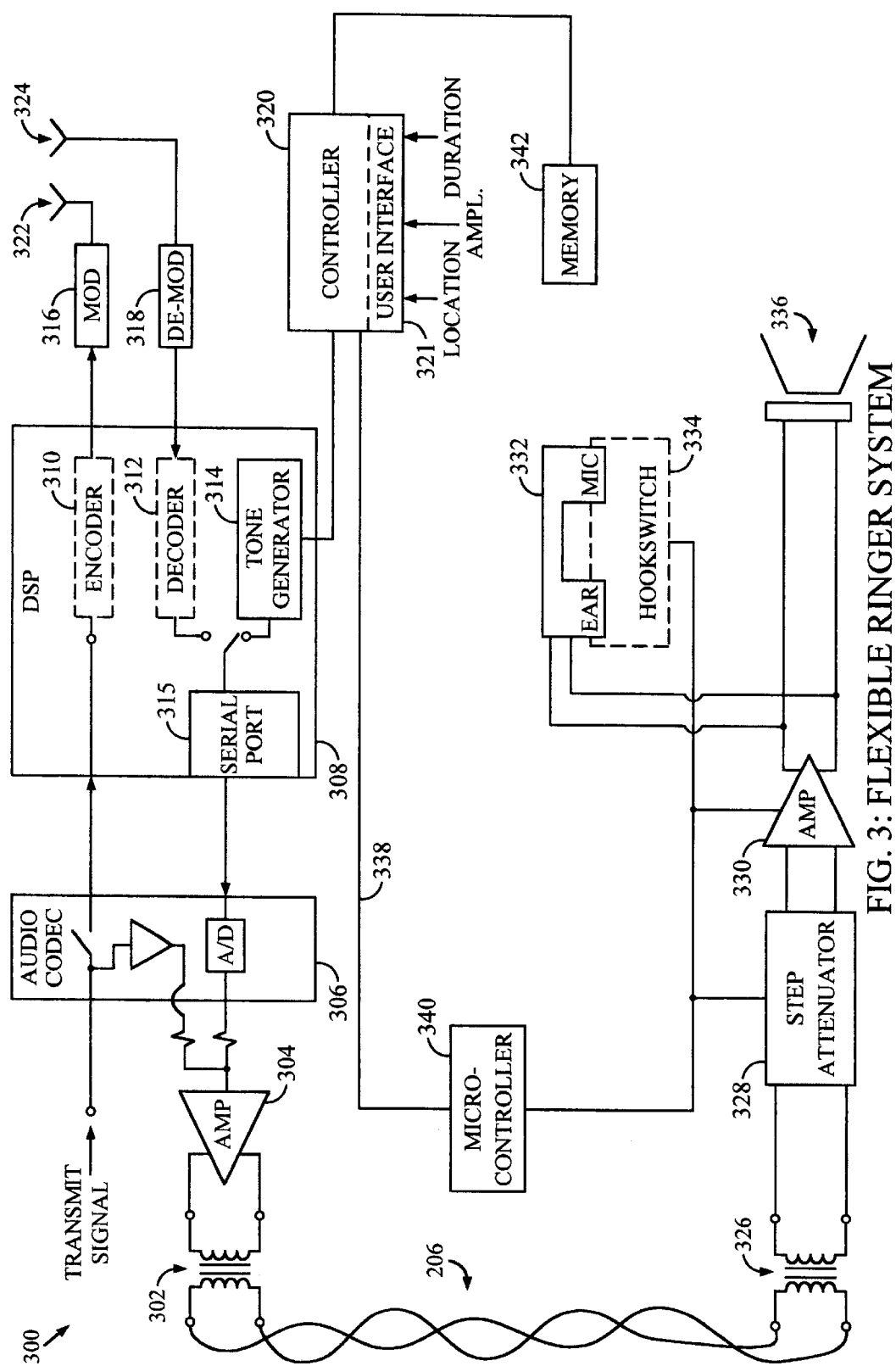
FIG. 3 is a block diagram depicting a flexible ringer system according to the present invention.

FIG. 3 illustrates the components in flexible ringer system 300 for announcing an incoming telephone call to users of desksets 102a–n according to the present invention. FIG. 3 includes: receive cable 206; transformers 302, 326; amplifiers 304, 330; audio codec 306; digital signal processor (DSP) 308; modulator 316; de-modulator 318; controller 320; user interface 321; antennas 322, 324; step attenuator 328; phone handset 332, hookswitch 334, speaker 336; control bus 338; and microcontroller 340, memory 342. DSP 308 comprises encoder 310, decoder 312, tone generator 314, and serial port 315. Generally, elements or devices 302 and 304 are known devices forming part of RAU interface 208 discussed above, while elements 306, 308, 310, 312, 316, 318, 322, and 324 are known components forming part of RAU 104.

It will be understood that the ringer system 300 components located in desksets 102a–n (namely, transformer 326, step attenuator 328, amplifier 330, handset 332, hookswitch 334, and speaker 336) are representative of components at multiple desksets 102a–n. Thus, ringer system 300 is capable of generating audible ringer sounds at multiple desksets 102a–n, simultaneously.

Illustrative components in ringer system 300 will be described below. In one embodiment, receive cable 206 is standard 2-wire twisted pair telephone cable. In an alternate embodiment, transmit cable 204 and receive cable 206 are both formed from standard 24 AWG 8-conductor twisted pair telephone cable with a maximum length of 1500 feet. In this embodiment, two of the eight conductors are reserved for transmit cable 204, two conductors for receive cable 206, two conductors for control bus 338, and two conductors are used as backup power cables. In an alternate embodiment, transmit and receive cables 204, 206 are both coaxial cables.

In one embodiment, transformers 302 and 326 are 1:1 audio transformers with a unity gain passband from 200 Hz to 3400 Hz. In an alternative embodiment, transformer 302 is configured as a 1:n transformer, with the secondary coil connected to receive cable 206. (Other ratios and frequency ranges, however, are useful for some applications). This offers the potential for voltage gain through transformer 302 at the expense of a greater noise level.

Amplifier 304 is based on an operational amplifier, such as the LM 4862 which is commercially available from National Semiconductor. The LM 4862 offers: sufficient output drive capability, low power dissipation, single supply operation, and a low cost. In one embodiment, amplifier 304 is configured with a single input and differential output, and is configured to provide 15 dB of gain over the audio range of interest using standard op amp feedback techniques. The gain was chosen maximize the output voltage swing of the LM 4862 given a maximum input from audio codec 306.

Amplifier 330 is also based on an op amp, such as the LM 4862, and is configured with a differential output to drive speaker 336. In one embodiment, amplifier 330 is configured to provide 6 dB of gain to insure the audible ringer sound produced by speaker 336 is sufficiently loud. The LM 4862 is capable of driving 1 watt of power into an 8 ohm speaker.

Audio codec 306 is a specialized processor that converts voice signals from analog to digital, and visa versa, and is generally commercially available. In one embodiment, the Voice Band Analog Processor (VBAP) available from Texas Instruments (part #TLC 320A36) is used for audio codec 428. The TI VBAP is a mixed signal part that has both A/D and D/A functionality and is specifically tuned for digital telephony applications. It uses a 2.048 MHZ master clock to drive conversion functions, and a 8 KHz frame sync to define the sampling frequency. In one embodiment, the digital input for the D/A function is configured as a serial stream of 16-bit digital words, where the last three bits are padded with "0"s. In an alternate embodiment, the TI VBAP can be configured to accept 8-bit words reflecting amplitude compression using one of linear, A-law, or MU-law compression.

DSP 308 is a specialized processor for performing mathematical calculations on digital signals, such as the commercially available Analog Devices 2185 (ADSP 2185). The ADSP 2185 is a 16-bit processor capable of operating at 18.67 MHz. Those skilled the art would recognize that other devices could be chosen for DSP 308.

Encoder 310, decoder 312, and tone generator 314 are "modules" operating on DSP 308. In one embodiment, these are control operations, programs, or computer programs that are "hard-wired" in dedicated sections of DSP 308. Alternatively, the instructions or control commands used to implement encoder 310, decoder 312, and tone generator 314 are stored in a memory, which may be shared, and called by DSP 308 as necessary. Alternatively, encoder 310, decoder 312, and tone generator 314 could exist on separate DSPs or signal processing elements, which are controlled and selected as needed by controller 320.

Tone generator 314 is a functional component of flexible ringer system 300 (as will be described below), but not encoder 310 and decoder 312. Encoder 310 (decoder 312) is a process or program that performs the traditional vocoder function of compressing (de-compressing) human speech before (after) carrier signal modulation (de-modulation). Vocoders operate on the principle that human speech sounds can be predicted and extrapolated based on analysis of a small portion of a sound. Once the phone call is answered, tone generator 314 is terminated or released, and encoder 310 and decoder 312 are made operational or engaged to process the voice conversation that follows.

In one embodiment, encoder 310, decoder 312, and tone generator 314 are independent callable sub-routines or control processes implemented on the same DSP 308. This results in efficient use of DSP 308, as the same DSP 308 can be used to generate the ringer signal for an incoming call, and perform the vocoder functions on ensuing voice conversation once the call has been answered. Further efficiencies are achieved because the audio components in ringer system 300 can be also be re-utilized in the receive path of audio interface 210 once the phone is answered and voice conversation begins.

One embodiment of the vocoder operations performed by encoder 310 and decoder 312 is fully described by U.S. Pat. No. 5,414,796 entitled Variable Rate Vocoder, which issued May 9, 1995, is assigned to the assignee of the present invention, and is incorporated herein by reference. A brief summary of the above referenced patent follows.

The vocoder disclosed in the above referenced patent implements a vocoding algorithm based on the Code Excited Linear Predictive (CELP) coding technique. The basic CELP technique is modified to produce a variable output data rate based on speech activity. The structure is defined so that the vocoding parameters are updated less often, or with less precision, during pauses in speech.

This technique allows for an even greater decrease in the amount of information to be transmitted. The phenomenon which is exploited to reduce the data rate is the speech activity factor, which is the average percentage of time a given speaker is actually talking during a conversation. For typical two-way telephone conversations, the average data rate is reduced by a factor of 2 or more. During pauses in speech, only background noise is being coded by the vocoder. At these times, some of the parameters relating to the human vocal tract model need not be transmitted.

The vocoder encoding algorithm determines the speech activity for each frame of digitized speech samples, and then an output data packet rate is selected from a set of rates based upon the determined level of frame speech activity. The lowest data rate of the set of rates corresponds to a detected minimum level of speech activity, such as background noise or pauses in speech, while a highest rate corresponds to a detected maximum level of speech activity, such as active vocalization. Each frame is then coded according to a predetermined coding format for the selected rate; wherein each rate has a corresponding number of bits representative of the coded frame. A data packet is provided for each coded frame with each output data packet of a bit rate corresponding to the selected rate.

Encoder 310 and decoder 312 are not limited to the vocoder algorithm described in U.S. Pat. No. 5,414,796 above. This is but on embodiment. Those skilled in the art will recognize that other vocoder algorithms could be operated on DSP 308 after the phone call has been answered. These include but are not limited to constant data rate vocoders, non-CELP based vocoders, and linear prediction vocoders.

Controller 320 is a general purpose microprocessor, such as the commercially available Intel 386EX microprocessor. Controller 320 controls and operates the components in ringer system 300 and includes a user interface 321. User interface 321 can be keyboard entry device, "touch screen" device, and so forth.

Hookswitch 334 comprises a LED and a photo-transistor. When handset 332 is picked up by a deskset user, light from the LED illuminates the photo-transistor causing current to conduct in the transistor. Microcontroller 340 detects the current and informs Controller 320. Controller 320 instructs DSP 308 to terminate generation of the ringer signal.

Modulator 316 modulates a carrier signal with transmit signals that are carried by transmit cable 204 from the desksets 102a–n. Antenna 322 then broadcasts the modulated carrier signal to satellite 108. Modulator 316 and antenna 322 are not functional components of ringer system 300, but are included for completeness.

Microcontroller 340 operates the deskset 102 components, and interfaces with the controller 320. The general duties for micro-controller 340 include scanning deskset 102 keypad for inputs, driving deskset 102 LEDs, and controlling deskset 102 LCD display. During ringer system operation, microcontroller 340 controls deskset 102 audio components per instructions from controller 320, as will be subsequently described. In one embodiment, a microcontroller commercially available from National Semiconductor as part COP988EG is used for microcontroller 340. The National COP988EG is an 8-bit microcontroller that includes a full duplex interface for communication with controller 320. The COP988EG has 39 Input/Output pins, 8 of which can sink 10 mA of current for audio component control. The COP988EG was chosen over similarly known microcontrollers primarily for its low cost.

Control bus 338 operates a control interface protocol that provides communications between RAU 104 and desksets 102a–n. An exemplary control interface protocol is fully described in co-pending U.S. patent application Ser. No. 09/201,701, filed on even date herewith, entitled "Control Interface Protocol For Telephone Sets For a Satellite Telephone System", of common Assignee, which is incorporated herein by reference.

The control interface protocol operated on control bus 338 determines which deskset 102a–n gets access to control bus 338 at a given time. The control interface is based on packets, where each packet is assigned an address. The packets comprise a start of header (SOH) byte, an address/sequence number (ADDR/SQN) byte, a command (CMD) byte, an argument (ARG) and a block check character (BCC). The ADDR/SQN byte comprises a source and a destination address of the packet. All packets, except negative acknowledgments (NAKs) from the desksets, are acknowledged by the RAU.

According to one embodiment, the ARG is one byte if the most significant bit (MSB) of the CMD is 1, and the ARG has a variable length if the MSB of the CMD is 0. The packet begins with the SOH byte. The BCC is a parity check of all characters from SOH to ARG. The BCC is formed by bit-wise exclusive or of each character sent, excluding SOH.

In one embodiment, the packets originating from the desksets are tagged with a source address between 1 and 8. A packet to a specific deskset is addressed using a destination address between 1 and 8. A packet originating from the RAU to all desksets are addressed using an address 0. A packet originating from the RAU to a deskset that does not have an address is addressed using an address 9. The packets are protected by horizontal and vertical parity checks. The BCC is the vertical parity check of all characters. The bit at the end of each character is a parity bit that is used for the horizontal parity check.

Once the phone call has been answered, ringer system 300 can function as a receive path for audio interface 210. The receive path carries audio receive signals (e.g. voice conversation) from codec 306 to the desksets 102a–n; where the related vocoder operations performed by decoder 312 have been described above. The components that can be reused for the audio interface receive path are: amp 304, transformers 302, 326, receive cable 206, step attenuator 328, amp 330, handset 332, and speaker 336.

Audio interface 210 is fully described in co-pending U.S. patent application Ser. No. 09/201,700, filed on even date herewith, entitled "Audio Interface For Satellite User Terminals," of common assignee, the full disclosure of which is incorporated by reference. A summary of the audio interface described in the above referenced patent application follows.

The audio interface comprises a transmit path comprising a transmit cable for carrying a transmit signal from the desksets to the RAU, and a receive path comprising a receive cable for carrying a receive signal from the RAU to the desksets. The transmit and receive paths are electrically isolated from each other, except that the receive signal contains an intentional sidetone that is derived from the transmit signal. In one embodiment, the transmit and receive cables are twisted together to further the goal of electrical isolation.

B. Operational Flowchart of Flexible Ringer System

Figure 4:
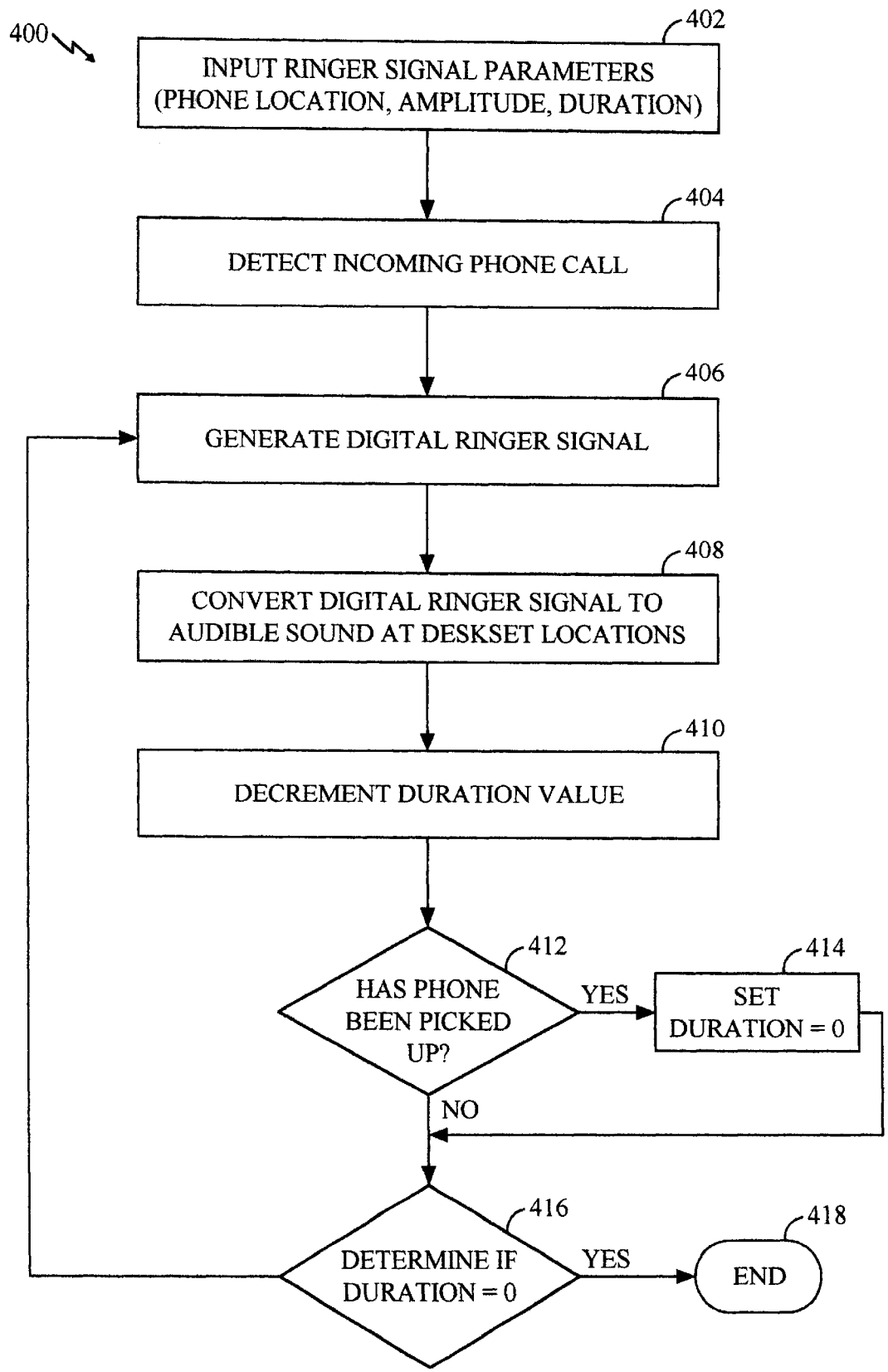
FIG. 4 is an operational flowchart that illustrates the generation of the audible ringer sound.
Figure 5:
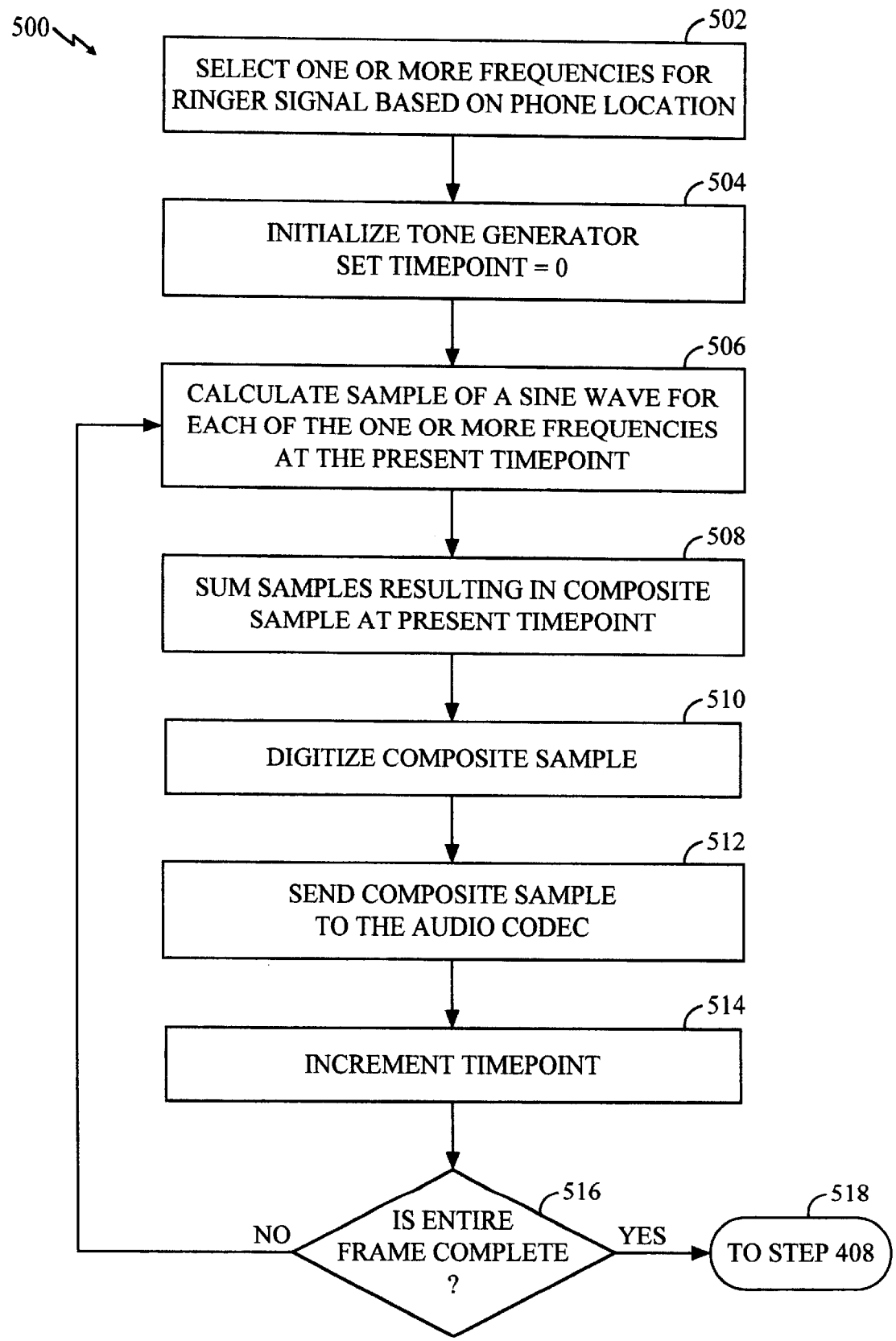
FIG. 5 is an operational flowchart that illustrates generation of the digital ringer signal.
Figure 6:
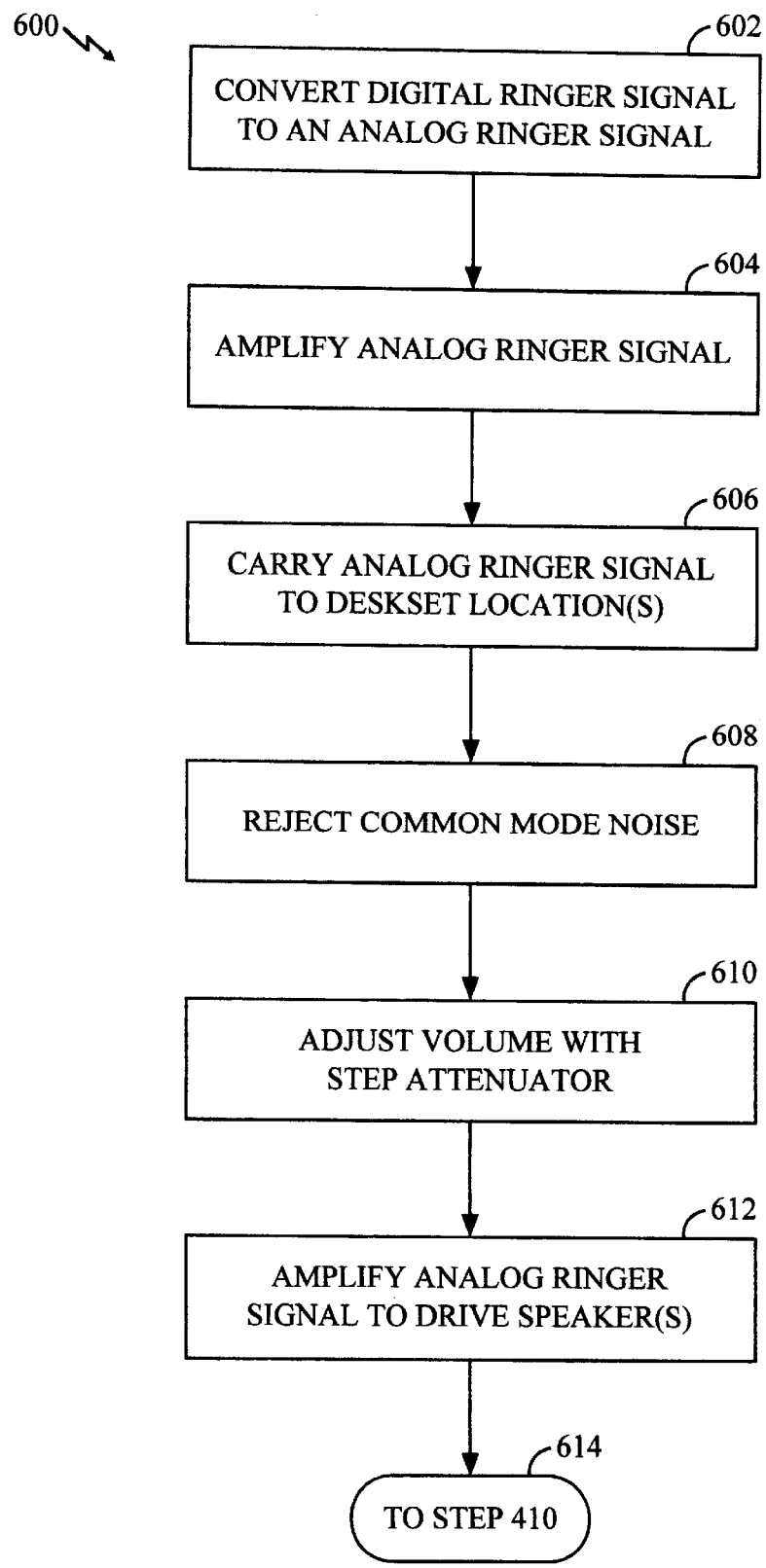
FIG. 6 is an operational flowchart that illustrates converting the digital ringer signal into an audible ringer sound at the deskset locations.

FIGS. 4–6 are operational flowcharts of a signal process or processing routine 400 for generating an audible ringer sound at multiple desksets 102a–n to announce an incoming telephone call. In the following sections, flowchart operations in FIGS. 4–6 will be discussed with reference to ringer system 300 components.

In step 402, controller 320 accepts the ringer signal input parameters through user interface 321. The input parameters comprise: the current geographic location of the deskset phone system, an amplitude value for the ringer signal, and an initial duration value for the ringer signal. The amplitude value is related to volume of the resulting ringer signal, and the initial duration value is the maximum time the ringer signal will be generated if the phone call is not picked up at a deskset 102.

In one embodiment, a user selects the geographic location from a menu of multiple geographic locations through user interface 321. Each geographic location has pre-assigned frequency(s) stored in memory 342, wherein the pre-assigned frequency(s) satisfy the local expectation of a ringing telephone for the assigned geographic location, or a specific user desired pattern. In an alternate embodiment, a user inputs the desired frequencies directly into controller 320 through user interface 321, without entering a geographic location. Likewise, the amplitude value and duration value can also be selected from a menu-like display, or entered directly without a menu-like display.

In step 404, controller 320 detects an incoming phone call from satellite system 100. Controller 320 monitors de-modulator 318, which demodulates input signals received through antenna 324. Controller 320 searches for a flag message that precedes an incoming phone call from satellite 108. When the flag is detected, controller 320 prompts DSP 308 to operate tone generator 314, and notifies microcontroller 340 to enter ringer operation.

In one embodiment, microcontroller 340 sets step attenuator 328 to it's minimum attenuation value in order to maximize the ringer volume at representative deskset 102. Alternatively, the microcontroller 340 at each deskset 102a–n may operate to pulse their respective speaker amplifier 330 on and off. At any one time, half the speaker amps 330 are turned on, and half the speaker amps are turned off. In doing so, the ringer system 300 peak power requirements are reduced. This increases the maximum number of desksets that can be accommodated for a given power supply, and increases the maximum length of transmit and receive cables 204, 206.

In step 406, controller 320 and tone generator 314 generate a digital ringer signal based on the ringer signal input parameters. In one embodiment discussed in relation to FIG. 5, the digital ringer signal is a frame of sine wave samples that are generated at specific time points. A timepoint is a point in time (relative to the sine wave period) where the sine wave sample (or value) is calculated. The present invention is not limited to using sine wave signals. Those skilled in the art will recognize that other signal types could be used including but not limited to: square waves, triangle waves, sine waves, and combination thereof.

In step 408, the digital ringer signal is converted to an audible ringer signal at deskset 102 using speaker 336.

In step 410, tone generator 314 decrements the duration value. The current duration value determines the maximum time remaining that the phone will ring, if the call is not "picked-up".

In step 412, controller 320 determines if the incoming phone call has been "picked up" at any of the desksets 102a–n. If so, then in step 414, controller 320 interrupts tone generator 314 and sets the duration value equal to 0. If the phone call has not been picked up, then the routine 400 proceeds to step 416. In one embodiment, controller 320 monitors hookswitch 334 using microcontroller 340 to detect a phone pick-up; where hookswitch 334 is tripped when handset receiver 332 is removed from it's cradle.

In step 416, tone generator 314 determines if the duration value is equal to 0. If so, routine 400 goes to step 418 where the tone generator 314 program ends, resulting in termination of the digital ringer signal. If not, then routine 400 goes back to step 406 and the digital ringer signal is re-generated. A duration value of 0 means either that the phone call has been picked up at a deskset 102 resulting in an interrupt from controller 320, or that the digital ringer signal has been generated for a time period sufficient to decrement the duration value to 0.

FIG. 5 illustrates a routine 500 for generating the digital ringer signal in step 406, once an incoming phone call from satellite 108 has been detected by controller 320.

In step 502, controller 320 selects the pre-assigned frequencies from memory 342 based on the current geographic location input received in step 402. As discussed in relation to step 402, the current geographic location can be selected from a menu of multiple geographic locations. Each geographic location in the menu is pre-assigned one or more frequencies that satisfies the local expectation of a ringing telephone for that particular geographic location. In an alternate embodiment, a user inputs his desired frequencies directly to controller 320 through user interface 321, without identifying a geographic location. Controller 320 sends the selected frequencies, duration value, and amplitude value to tone generator 314.

Typically, a ringer signal will have at least two frequency components, within the range of 500 Hz–6000 Hz. However, the invention does not require two frequency components, as one frequency component will also work. Also, the invention is not limited to the frequency range of 500 Hz–6000 Hz. Those skilled in the art will recognize that other frequencies can be used based on the discussion given herein.

In step 504, tone generator 314 self initializes by setting the present timepoint equal to 0 in preparation to calculate a frame of sine wave samples. As stated earlier, a timepoint is a point in time where a sine wave sample is calculated. In one example embodiment, the digital ringer signal frame is 5 msec long and contains 40 samples determined at 40 timepoints. The timepoints will occur at: 0, 125 $\mu$sec, 250 $\mu$sec, 375 $\mu$sec, as so forth, up to the last timepoint at 5000 $\mu$sec (5 msec). This example is given for illustration purposes only and is not meant to limit the invention in any way. Those skilled in the arts will recognize that other configurations can be used based on the discussion given herein.

In step 506, tone generator 314 calculates a sample (or value) of a sine wave at the present timepoint for each of the one or more selected frequencies from step 502. The sine wave amplitude used for the calculation is based on the input amplitude value entered in step 402.

An example sine wave sample calculation is as follows. Assume that the selected frequencies (step 502) are 900 Hz and 1700 Hz, the sine wave amplitude (step 402) is normalized to 1.0 v, and the present timepoint is 250 $\mu$sec. The samples are calculated from following equation: $\sin(2\pi \cdot (\text{freq}) \cdot (\text{timepoint}))$. The resulting samples for 900 Hz and 1700 Hz are: 0.9877 v, and 0.454 v, respectively. This example is meant as an illustration only, and is not meant to limit the invention in any way. Those skilled in the art would recognize that other mathematical expressions could be useful in generating a digital ringer based on the discussion herein.

In step 508, tone generator 314 sums the sine wave samples (from step 506) resulting in a composite sample at the present timepoint. Step 508 is bypassed if only one frequency is selected for the digital ringer signal in step 502, since there is no need for summation of only one sample.

In step 510, tone generator 314 generates data of a selected length (bits), also referred to as digital word, to represent the composite sample using pulse code modulation (PCM) or some other known quantization technique.

In step 512, tone generator 314 causes serial port 315 to send the digital word to audio codec 306. In one embodiment, the digital word is a 16-bit digital word in linear format, where the last three bits are set to 0. In an alternate embodiment, audio codec 314 is configured to accept 8-bit digital words, where tone generator 314 or serial port 315 compresses the 16-bit digital word using one of linear, MU-law, or A-law amplitude compression. Those skilled in the art will readily understand there are other data compression techniques that could be used.

In step 514, tone generator 314 increments the timepoint value, and in step 516 tone generator 314 determines whether or not it has computed an entire frame of composite samples for the digital ringer signal. If yes, then in step 518, routine 500 goes to step 408. If no, then routine 500 goes to step 506 to generate another composite sample at the new present timepoint.

The following summarizes and expands on the example embodiment discussed throughout routine 500 to further illustrate the present invention. In one embodiment, the digital ringer signal frame comprises 40 composite samples calculated at 40 timepoints over a 5 msec frame duration, where the timepoints are separated by 125 $\mu$sec (5 msec/40). Thus, composite samples would be calculated at timepoints: 0 sec, 125 $\mu$sec, 250 $\mu$sec, 375 $\mu$sec, and so forth, up to 5000 $\mu$sec (5 msec). Thus, audio codec 306 receives a 16-bit composite sample every 125 $\mu$sec during a 5 msec frame period. The number of 5 msec frame periods is determined by the input duration value, unless controller 320 interrupts (by setting the duration value to 0) because the call was answered at a deskset 102. For example, if the input duration value is 20 seconds, then 4000 digital ringer signal frames will be generated, and each frame will have 40 composite samples. This example is given for illustration only and is not meant to limit the invention in any way. Those skilled in the arts will recognize that other configurations can be used based on the discussion given herein.

FIG. 6 illustrates a routine 600 for converting the digital ringer signal to an audible ringer sound at deskset 102 in step 408.

In step 602, audio codec 306 converts the digital ringer signal generated in step 406 to an analog ringer signal.

In step 604, amplifier 304 amplifies the analog ringer signal to drive receive cable 206. Amplifier 304 is configured with a differential output resulting in a differential signal.

In step 606, receive cable 206 carries the analog ringer signal to deskset 102 location(s).

In step 608, transformer 326 rejects any common mode noise generated by receive cable 206 and imposed on the analog ringer signal. Transformer 326 passes only differential signals and rejects common mode signals, which is typically an inherent feature of standard transformers. Receive cable 206 is a likely source of common mode noise when standard unshielded telephone cable is used, where the noise level increases with increasing cable length. Therefore, a transformer is preferred but not always required.

In step 610, step attenuator 328 attenuates the ringer signal to operate as a volume control for speaker 336. In one embodiment, controller 320 sets step attenuator 328 to the minimum attenuation through microcontroller 340, insuring maximum volume for the audible ringer sound. In an alternate embodiment, a user adjusts the volume of the ringer signal for all desksets 102*a–n* through controller 320 and interface 321. Controller 320 instructs microcontrollers 340 to adjust attenuator 328 accordingly. In alternate embodiment, a user adjusts the volume at each individual deskset 102*a–n* using the deskset 102 keypad.

In step 612, amplifier 330 amplifies the analog ringer signal to drive speaker(s) 336. Speaker 336 converts the analog ringer signal to an audible ringer sound at deskset 102. In step 614, routine 600 goes to step 410.

An advantage of generating the audible ringer using a digital ringer signal is that the digital ringer signal can be efficiently customized for different geographic locations, or for specific users, as desired. This is feasible because the digital ringer signal comprises digitized samples of one or more calculated sine waves. The digital ringer signal can be customized by varying the frequencies of the sine waves. Frequency control is implemented by allowing a user to select the current geographic location from a menu of multiple geographic locations stored on controller 320 and memory 342. Each geographic location in the menu is assigned the necessary frequencies to satisfy the local expectation of a ringing telephone at that particular geographic location. Alternatively, the user can directly input the desired frequencies into controller 320 without referencing a geographic location. The user can also be allowed to select from a non-geographic specific or related list of frequencies that are commonly desired or found useful by users.

The foregoing description has discussed the invention in a party line configuration. However, the invention is not limited to a party line configuration. Those skilled in the art would recognize how to implement the present invention in a single line configuration (i.e. one phone or deskset per phone number, UT address, or UT ID) based on the discussion given herein. In fact, a party line reduces to a single line configuration when there is only one phone connected to the party line, as is understood by those skilled in art.

Furthermore, the use of a DSP to generate a digital ringer signal is not limited to a stationary phone configuration. The DSP configuration described herein allows a phone user to select the frequencies of the digital ringer signal that is generated by the DSP. As such, the DSP configuration is also useful to generate a flexible ringer signal for a mobile or portable telephone, as will be understood by those skilled in art based on the discussion given herein.

C. Computer Implementation of Invention

The subject invention has been described above with the aid of functional building blocks illustrating the performance of specified functions and relationships thereof. The boundaries of these functional building blocks have been defined partly for the convenience of the description. Alternate boundaries may be defined so long as the specified functions and relationships thereof are appropriately performed. Any such alternate boundaries are thus within the scope and spirit of the claimed invention. These functional building blocks may be implemented by discrete components, application specific integrated circuits, processors executing appropriate software, and the like or any combination thereof.

Figure 7:
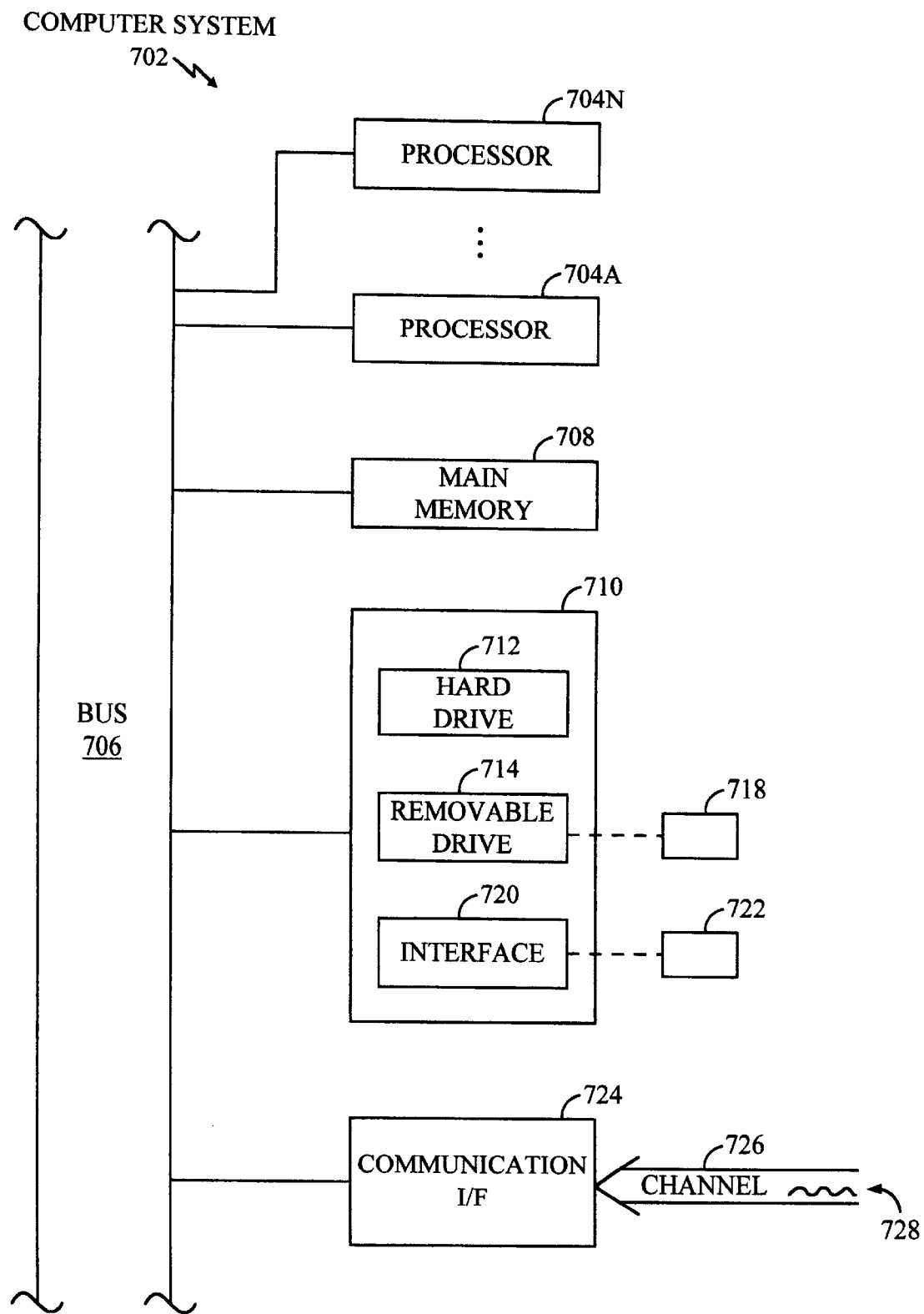
FIG. 7 is a block diagram depicting a computer implementation of the present invention.

In one embodiment, the invention is directed toward a software and/or hardware embodiment in a computer system. An example programmable control processor device or computer system 702 is shown in FIG. 7. The computer system 702 includes one or more processors, such as processors 704A–N, which comprise at least DSP 308, controller 320, microcontroller 340. The processors 704A–N are connected to a communication bus 706. Various software embodiments are described in terms of this example computer system. After reading this description, it will become apparent to a person skilled in the relevant art how to implement the invention using other computer systems and/or computer architectures.

Computer system 702 also includes a main memory 708, preferably random access memory (RAM), and can also include a secondary memory or secondary storage 710.

In alternative embodiments, secondary memory 710 may include other similar means for allowing computer software and data to be loaded into computer system 702. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 718 to computer system 702.

Computer system 702 can also include a communications interface 724. Communications interface 724 allows software and data to be transferred between computer system 702 and external devices, such as audio codec 306. Examples of communications interface 724 can include a modem, a network interface (such as an Ethernet card), a communications port, a shift register, a PCMCIA slot and card, etc. Software and data transferred via communications interface 724 are in the form of signals 726 which can be electronic, electromagnetic, optical or other signals capable of being received by communications interface 724. These signals 726 are provided to communications interface using a channel 728. This channel 728 carries signals 726 and can be implemented using wire or cable, fiber optics, a phone line, a cellular phone link, an RF link and other communications channels.

In this document, the terms "computer program medium" and "computer usable medium" are used to generally refer to media such as removable storage device 718, a hard disk installed in hard disk drive 712, and signals 726. These computer program products are means for providing software (e.g., computer programs) to computer system 702.

Computer programs (also called computer program logic) are generally stored in main memory 708 and/or secondary memory 710 and executed therefrom. Computer programs can also be received using communications interface 724. Such computer programs, when executed, enable the computer system 702 to perform the features of the present invention as discussed herein. In particular, the computer programs, when executed, enable the processor 704 to perform the features of the present invention. Accordingly, such computer programs represent controllers of the computer system 702.

In an embodiment where the invention is implemented using software, the software may be stored in a computer program product and loaded into computer system 702 using removable storage drive 714, hard drive 712 or communications interface 724. The computer control logic (software), when executed by the processor 704, causes the processor 704 to perform the functions of the invention as described herein.

In another embodiment, the invention is implemented primarily in hardware using, for example, hardware components such as application specific integrated circuits (ASICs), or more specifically digital signal processors (DSPs), such as DSP 308. Implementation of the hardware state machine so as to perform the functions described herein will be apparent to persons skilled in the relevant art(s).

In yet another embodiment, the invention is implemented using a combination of both hardware and software, and/or firmware.

IV. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as the invention is:

1. A flexible ringer system for ringing a deskset phone to announce an incoming telephone call, the flexible ringer system comprising:
   means for detecting a flag message preceding an incoming telephone call;
   a digital signal processor (DSP) for generating a digital ringer signal based on a local expectation of a ringing telephone at a geographic location, and enabled by said flag message;
   means for converting said digital ringer signal to an audible ringer sound at the deskset phone; and
   a radio antenna unit (RAU) comprising a user interface for allowing a user to tailor a set of user parameters to be processed by said DSP.

2. The ringer system of claim 1, wherein said means for converting comprises:
   means for converting said digital ringer signal to an analog ringer signal;
   means for amplifying said analog ringer signal;
   means for carrying said analog ringer signal to the deskset phone;
   means for rejecting common mode noise imposed on said analog ringer signal; and
   means for driving a speaker to convert said analog ringer signal to said audible ringer sound at the deskset phone.

3. The ringer system of claim 1, further comprising:
   means for determining when the incoming telephone call has been answered; and
   means for terminating said ringer signal generation operation of said DSP when said telephone call has been answered.

4. The ringer system of claim 1, further comprising means for selecting a plurality of frequencies for said digital ringer signal based on said local expectation associated with the geographic location.

5. The ringer system of claim 4, wherein said means for selecting comprises means for selecting the geographic location from a menu of multiple geographic locations, wherein each geographic location in said menu is assigned a plurality of frequencies that satisfies a local expectation of a ringing telephone.

6. The ringer system of claim 4, wherein said DSP comprises:
   means for determining a sample of a sine wave for each of said plurality of frequencies at a timepoint, resulting in a plurality of samples at said timepoint;

means for summing said plurality of samples resulting in a composite sample at said timepoint; and means for digitizing said composite sample, whereby said digitized composite sample comprises said digital ringer signal.

7. The ringer system of claim 6, further comprising means for repeatedly determining said samples, summing said samples, and digitizing said composite sample to produce a frame of digitized composite samples.

8. The ringer system of claim 6, wherein said means for digitizing said composite sample comprises means for generating a digital word to represent said composite sample.

9. The ringer system of claim 8, further comprising means for compressing said digital word using one of MU-law compression, and A-law compression resulting in a compressed digital word, wherein said compressed digital word comprises a lower number of bits than said digital word.

10. The ringer system of claim 1, further comprising means for selecting a frequency for said digital ringer signal based on said local expectation associated with the geographic location.

11. The ringer system of claim 10, wherein said DSP comprises:

means for determining a sample of a sine wave for said frequency at a timepoint; and means for digitizing said sample, whereby said digitized sample comprises said digital ringer signal.

12. The ringer system of claim 11, further comprising means for repeating determining said sample, and digitizing said sample to produce a frame of digitized samples.

13. The flexible ringer system of claim 1, further comprising a vocoder means for operating said DSP as a vocoder on telephone conversation that occurs after said telephone call has been answered.

14. The flexible ringer system of claim 13, wherein said telephone conversation comprises outgoing telephone conversation and incoming telephone conversation, wherein said vocoder means comprises:

compression means for compressing said outgoing telephone conversation; and decompression means for decompressing said incoming telephone conversation.

15. A method for ringing a deskset phone to announce an incoming telephone call, the method comprising the steps of:

detecting a message announcing an incoming telephone call;

generating a digital ringer signal using a digital signal processor (DSP) based on a local expectation of a ringing telephone at a geographic location, and enabled by the message;

allowing a user to tailor a set of user parameters at a radio antenna unit (RAU) to be processed by said DSP; and converting the digital ringer signal to an audible ringer sound at the deskset phone.

16. The method of claim 15, wherein said step of converting comprises the steps of:

converting the digital ringer signal to an analog ringer signal;

amplifying the analog ringer signal;

carrying the analog ringer signal to the deskset phone;

rejecting common mode noise imposed on the analog ringer signal; and driving a speaker to convert the analog ringer signal to the audible ringer sound at the deskset phone.

17. The method of claim 15, further comprising:

determining when the incoming telephone call has been answered; and terminating the digital ringer signal when the telephone call has been answered.

18. The method of claim 15, wherein said step of generating the digital ringer signal comprises the steps of:

selecting a plurality frequencies for the digital ringer signal based on the local expectation associated with the geographic location;

determining a sample of a sine wave for each of the plurality of frequencies at a timepoint, resulting in a plurality of samples at the timepoint;

summing the plurality of samples resulting in a composite sample at the timepoint; and digitizing the composite sample, whereby the digitized composite sample comprises the digital ringer signal.

19. The method of claim 18, further comprising the step of repeating said steps of determining, digitizing, and summing over multiple timepoints resulting in a frame of the digitized composite samples.

20. The method of claim 18, wherein said step of digitizing the composite sample comprises the step of generating a digital word to represent the composite sample.

21. The method of claim 18, further comprising the step of compressing the digital word using one of MU-law compression, and A-law compression and resulting in a compressed digital word.

22. The method of claim 18, wherein said step of selecting comprises selecting the geographic location from a menu of multiple geographic locations, wherein each geographic location in the menu is assigned a plurality of frequencies based on the local expectation of a ringing telephone.

23. The method of claim 15, wherein said step of generating the digital ringer signal comprises the steps of:

selecting a frequency for the digital ringer signal based on the local expectation associated with the geographic location;

determining a sample of a sine wave for said frequency at a timepoint; and digitizing the sample, whereby the digitized sample comprises the digital ringer signal.

24. The method of claim 15, further comprising:

operating said DSP as a vocoder on telephone conversation that results after said incoming telephone call has been answered at the deskset phone.

25. The method of claim 24, wherein said telephone conversation comprises outgoing telephone conversation and incoming telephone conversation, wherein said vocoder operating step further comprises the step of compressing said outgoing telephone conversation, and decompressing said incoming telephone conversation.

26. The method of claim 15, wherein said generating step comprises the step of generating a digital ringer signal using a digital signal processor (DSP) based on a desired frequency of a deskset user.

27. A flexible ringer for ringing a deskset phone to announce an incoming telephone call, the ringer comprising:

a controller for detecting a message announcing the incoming phone call, said controller comprising a user interface for allowing a user to input a desired frequency for a digital ringer signal into said controller;

a digital signal processor (DSP) for generating a digital ringer signal based on a local expectation of a ringing telephone at a geographic location, and triggered by said message;

an audio codec for converting said digital ringer signal to an analog ringer signal; and a speaker at the deskset phone for converting said analog ringer signal to an audible ringer sound, in accordance with said local expectation of a ringing telephone.

28. The ringer of claim 27, wherein said controller, said DSP, and said audio codec are located at a first location, and said deskset phone is located at a second location further comprising:

an amplifier coupled to the output of said audio codec for amplifying said analog ringer signal;

a cable coupled to the output of said amplifier for carrying said analog ringer signal to the second location;

at least one transformer coupled to said cable for rejecting common mode noise; and a second amplifier coupled to the output of said transformer for driving said speaker.

29. The ringer of claim 27, wherein said controller comprises a processor having computer program logic stored therein, wherein said computer program logic comprises:

first computer program code means for causing the processor to select a plurality of frequencies for said digital ringer signal based on said local expectation of a ringing telephone at the geographic location; and second computer program code means for causing the processor to send said selected plurality of frequencies to said DSP.

30. The ringer of claim 29, wherein said first computer program code means comprises computer program code means for causing the processor to receive a command selecting the geographic location from a menu of multiple geographic locations, wherein each geographic location in said menu is assigned a plurality of frequencies based on a local expectation of a ringing telephone at each geographic location.

31. The ringer of claim 29, wherein said DSP comprises a second processor having computer program logic stored therein for generating a digital ringer signal, wherein said computer program logic comprises:

third computer program code means for causing the second processor to determine a sample of a sine wave for each of said plurality of frequencies at a timepoint, resulting in a plurality of samples at said timepoint;

fourth computer program code means for causing the second processor to sum said plurality of samples resulting in a composite sample at said timepoint; and fifth computer program code means for causing the second processor to digitize said composite sample, whereby the digitized composite sample comprises the digital ringer signal.

32. The ringer of claim 31, wherein said computer program logic further comprises computer program code means for causing the second processor to repeat over multiple timepoints said third computer program code means, said fourth computer program code means, and said fifth computer program code means, resulting in a frame of said digitized composite samples.

33. The ringer of claim 31, wherein said fifth computer program code means comprises computer program code means for causing the second processor to generate a digital word to represent said composite sample.

34. The ringer of claim 31, wherein said second processor further comprises second computer program logic for causing said second processor to operate as a vocoder on incoming and outgoing telephone conversation that results after said incoming telephone call has been answered, wherein said second computer program logic comprises:

computer program code means for compressing said outgoing telephone conversation; and computer program code means for decompressing said incoming telephone conversation.

35. The ringer of claim 27, further comprising sixth computer program code means for causing said second processor to compress said digital word using one of linear compression, MU-law compression, and A-law compression resulting in a compressed digital word, wherein said compressed digital word comprises a lower number of bits than said digital word.

36. The ringer of claim 27, wherein said controller comprises a processor having computer program logic stored therein, wherein said computer program logic comprises:

first computer program code means for causing the processor to select a frequency for said digital ringer signal based on said local expectation of a ringing telephone at the geographic location; and second computer program code means for causing the processor to send said selected frequency to said DSP.

37. The ringer of claim 36, wherein said DSP comprises a second processor having computer program logic stored therein, wherein said computer program logic comprises:

third computer program code means for causing the second processor to determine a sample of a sine wave for said frequency at a timepoint; and fourth computer program code means for causing the second processor to digitize said sample, whereby the digitized sample comprises the digital ringer signal.

38. The flexible ringer of claim 27, wherein said DSP generates a digital ringer signal based on a desired frequency of a deskset user.

39. A computer program product comprising a computer useable medium having computer program logic recorded thereon for enabling a processor in a computer system to generate a digital ringer signal, said computer program logic comprising:

first computer program code means for causing the processor to select a plurality of frequencies for a digital ringer signal based on a local expectation associated with the geographic location and for enabling said processor to receive user input parameters;

second computer program code means for causing the processor to determine a sample of a sine wave for each of said plurality of frequencies at a timepoint resulting in a plurality of samples at said timepoint;

third computer program code means for causing the processor to sum said plurality of samples resulting in a composite sample at said timepoint; and fourth computer program code means for causing the processor to digitize the composite sample, whereby the digitized composite sample comprises the digital ringer signal.

40. The computer program product of claim 39, wherein said first computer program code means comprises computer program code means for causing the processor to receive a command selecting the geographic location from a menu of multiple geographic locations, wherein each geographic location in said menu is assigned a plurality of frequencies based on a local expectation of a ringing telephone at each geographic location.

41. The computer program product of claim 39 wherein said computer program logic further comprises computer program code means for causing the processor to repeat over multiple timepoints said first computer program code means, said second computer program code means, said third computer program code means, and said fourth computer program code means, resulting in a frame of said digitized composite samples.

42. The computer program product of claim 39, wherein said fourth computer program code means comprises means for causing the processor to generate a digital word to represent said composite sample.

43. The computer program product of claim 40, further comprising fifth computer program code means for causing said processor to compress said digital word using one of MU-law compression, or A-law compression techniques resulting in a compressed digital word, wherein said compressed digital word comprises a lower number of bits than said digital word.

44. A wireless communications system, comprising:
 a radio antenna unit (RAU) for receiving and transmitting radio signals, said RAU comprising a user interface for allowing a user to tailor a set of user parameters to be processed by a digital signal processor (DSP);
 a deskset phone;
 a communications medium coupling said RAU to said deskset phone to allow said deskset phone to exchange packets with said RAU; and
 a flexible ringer subsystem for ringing said deskset phone to announce an incoming telephone call, said flexible ringer subsystem comprising:
  a controller for detecting a message announcing the incoming phone call;
  said DSP for generating a digital ringer signal based on a local expectation of a ringing telephone at a geographic location, and triggered by said message;
  an audio codec for converting said digital ringer signal to an analog ringer signal; and
  a speaker at said deskset phone for converting said analog ringer signal to an audible ringer sound, in accordance with said local expectation of a ringing telephone.

* * * * *